US007639157B1

(12) United States Patent  (10) Patent No.: US 7,639,157 B1
Whitley et al.  (45) Date of Patent: Dec. 29, 2009

(54) WIRELESS TELEMETRY METHODS AND SYSTEMS FOR COMMUNICATING WITH OR CONTROLLING INTELLIGENT DEVICES

(75) Inventors: Kevin T. Whitley, Acworth, GA (US);
Karl B. Warfel, Bellevue, WA (US);
Arthur M. Shand, Big Canoe, GA (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 0 days.

(21) Appl. No.: 09/647,028

(22) PCT Filed: Mar. 24, 1999
(Under 37 CFR 1.47)

(86) PCT No.: PCT/US99/06429
§ 371 (c)(1),
(2), (4) Date: May 29, 2002

(87) PCT Pub. No.: WO99/49680

PCT Pub. Date: Sep. 30, 1999

Related U.S. Application Data

(60) Provisional application No. 60/079,215, filed on Mar. 24, 1998.

(51) Int. Cl.
*G08C 15/06* (2006.01)
(52) U.S. Cl. .............................. 340/870.02; 340/870.11; 379/106.01; 455/466; 702/62
(58) Field of Classification Search ............ 340/870.02, 340/870.07, 870.11; 455/466; 702/62; 379/106.01, 379/106.03
See application file for complete search history.

(56) References Cited

U.S. PATENT DOCUMENTS 4,101,872 A 7/1978 Pappas (Continued)

FOREIGN PATENT DOCUMENTS

DE 297 17 504 U1 1/1998

(Continued)

OTHER PUBLICATIONS

International Search Report, PCT/WO 95/24791, Sep. 14, 1995.

(Continued)

*Primary Examiner*—Timothy Edwards, Jr.
(74) *Attorney, Agent, or Firm*—Cantor Colburn LLP

(57) ABSTRACT

Methods and apparatus are disclosed for remotely monitoring and controlling via a wireless network various devices deployed in homes and businesses. The present invention allows for monitoring and control of various gateways distributed to remotely located facilities to be monitored and the devices coupled to those gateways to be controlled via a wireless communications network. Preferably, the network is a GSM network adapted to provide short messaging services or any type of wireless network adapted to operate a General Packet Radio System for delivering data over the network. Messages are packaged at each gateway for delivery via the network to a destination terminal, whether a fixed terminal or a mobile station. Likewise, customers may forward data and commands to a particular gateway either from a mobile station or by accessing a fixed terminal, such as through an Internet connection. Transporting messages or commands via the short messaging service of the GSM network or via the GPRS protocol avoids the prohibitive cost of setting up a call for each message and avoids the significant capital costs needed to set up a separate communication network for data delivery.

17 Claims, 4 Drawing Sheets

U.S. PATENT DOCUMENTS

| | | |
|---|---|---|
| 4,577,182 A | 3/1986 | Millsap et al. |
| 4,614,945 A | 9/1986 | Brunius et al. |
| 4,691,341 A | 9/1987 | Knoble et al. |
| 4,713,837 A | 12/1987 | Gordon |
| 4,724,435 A | 2/1988 | Moses et al. |
| 4,799,059 A | 1/1989 | Grindahl et al. |
| 4,940,976 A | 7/1990 | Gastouniotis et al. |
| 5,056,107 A | 10/1991 | Johnson et al. |
| 5,146,486 A | 9/1992 | Lebowitz |
| 5,194,860 A | 3/1993 | Jones et al. |
| 5,243,644 A | 9/1993 | Garland et al. |
| 5,327,478 A | 7/1994 | Lebowitz |
| 5,438,329 A | 8/1995 | Gastouniotis et al. |
| 5,442,341 A | 8/1995 | Lambropoulos |
| 5,448,230 A | 9/1995 | Schanker et al. |
| 5,454,024 A | 9/1995 | Lebowitz |
| 5,544,036 A | 8/1996 | Brown, Jr. et al. |
| 5,546,444 A | 8/1996 | Roach, Jr. et al. |
| 5,548,633 A | 8/1996 | Kujawa et al. |
| 5,572,438 A * | 11/1996 | Ehlers et al. ............... 307/126 |
| 5,594,740 A | 1/1997 | LaDue |
| 5,617,084 A | 4/1997 | Sears |
| 5,673,252 A | 9/1997 | Johnson et al. |
| 5,699,276 A | 12/1997 | Roos |
| 5,717,718 A | 2/1998 | Rowsell et al. |
| 5,719,563 A | 2/1998 | Thompson, Jr. |
| 5,719,564 A | 2/1998 | Sears |
| 5,719,918 A * | 2/1998 | Serbetciouglu et al. ....... 379/58 |
| 5,729,197 A | 3/1998 | Cash |
| 5,745,849 A | 4/1998 | Britton |
| 5,748,084 A | 5/1998 | Isikoff |
| 5,748,103 A | 5/1998 | Flach et al. |
| 5,748,104 A | 5/1998 | Argyroudis et al. |
| 5,897,607 A * | 4/1999 | Jenney et al. ................. 702/62 |
| 6,014,089 A * | 1/2000 | Tracy et al. ............ 340/870.02 |

FOREIGN PATENT DOCUMENTS

| | | |
|---|---|---|
| DE | 296 23 292 U1 | 4/1998 |
| EP | 0 645 941 A2 | 9/1994 |
| EP | 0 731 590 A2 | 2/1996 |
| EP | 0 782 357 A2 | 12/1996 |

OTHER PUBLICATIONS

International Search Report, PCT/WO 97/09813, Mar. 13, 1997.
International Search Report, PCT/WO 96/38970, Dec. 5, 1996.
International Search Report, PCT/WO 98/19480, May 7, 1998.
International Search Report, PCT/WO 97/44946, Nov. 27, 1997.

* cited by examiner

WIRELESS TELEMETRY METHODS AND SYSTEMS FOR COMMUNICATING WITH OR CONTROLLING INTELLIGENT DEVICES

RELATED APPLICATIONS

This application claims priority under U.S. law to U.S. provisional patent application 60/079,215, filed Mar. 24, 1998, which application is hereby incorporated in its entirety by this reference.

BACKGROUND OF THE INVENTION

Numerous systems exist for automated, remote monitoring of various appliances, including electric utility meters and the like. For instance, systems exist that couple utility meters to remotely located databases via the wired Public Switched Telephone Network ("PSTN") so that the meters can be more efficiently and cheaply read remotely. Typically, such meter reading systems couple a database to a gateway that interfaces with the meter and, in many cases, other devices in a particular facility or portion thereof. These systems, however, are generally one way, sending data from the meter to the central processor.

Moreover, even when the system provides for two-way or duplex data communication that allows commands and other data to be down or up loaded to or from the gateway, a complete call must be made between the central processor and the gateway. Such calls are expensive, since they involve the full architecture of the PSTN in delivering the data, even when the amount of data delivered is relatively small. Also, the data or commands must be sent to or from a relatively intelligent central processor to which few persons will have access. This means, for instance, that customers at whose premises gateways are located cannot themselves send data (including commands for devices within the premises) to the gateway via the PSTN.

Systems exist that use short bursts of radio transmission to control and receive data from remote power distribution control terminals. For instance, a company called ITRON owns a U.S. Pat. No. 5,475,867 to Blum on such a system, albeit a system that uses supplemental controllers for expanding the fairly limited geographical range of the basic system. This system, however, would be expensive to deploy and operate since an essentially new architecture would need to be deployed.

Several companies, such as CellNet Data, Greenland and possibly ITRON, are trialing meter reading systems that use two-way paging, which provides broader geographic coverage. While such a system eliminates the trouble and expense of setting up a separate call each time data must be up or downloaded, paging messages provide limited payload for data, thereby limiting the potential for controlling and updating the gateway. Also, it is unclear whether such systems will allow users to send data and commands to or receive data from the gateway directly and without the need to go through a central processor or control center, which limits the flexibility of the system for users wishing to receive data about their facilities and remotely control various devices at the facility.

SUMMARY OF THE INVENTION

The present invention overcomes the above problems by providing a system and method for gathering and sending data over an existing wireless network remotely to control and monitor various gateways and the devices coupled to those gateways. A system according to the present invention uses multiple gateways that communicate over a wireless communications network capable of carrying digital data. The wireless communications network allows the gateway to send data and receive commands directly from the customer, which could own or manage the facility in which the gateway is located. The customer can send and receive such data via a mobile station or a fixed terminal. Simultaneously or independently, data and commands may be up and down loaded to or from a control center coupled to the wireless network. Thus, the present invention provides a system and methods for providing customers a virtual direct connection for routing messages to a gateway from a mobile station or fixed terminal, or vice versa.

The present invention uses multiple control and reporting gateways that are deployed in homes, businesses and other facilities. These gateways are configured to collect data, such as data describing use of electric power or other utilities by the particular facility at which they are located or data describing the status of various sensors after arming of a security system. Also, gateways may be coupled to various devices within the facility in order to control the devices. For instance, gateways may control the lights within a facility according to a pre-programmed pattern that the user may change by communicating new commands via the present invention. Or, gateways may be configured remotely to receive commands and data, which allows remote control over the devices (e.g., home appliances or electronics) with which the gateway may communicate. Each uniquely addressable gateway includes a transceiver capable of communicating over a wireless network.

In one embodiment of the present invention, a monitoring and control system may be provided that receives data from gateways on an essentially real time basis and can send data (including commands) to such gateways at any time over a wireless network. This allows for essentially real time monitoring of the facility at which the gateway is located. Preferably, the wireless network will be a GSM ("Global System for Mobile") communications network capable of providing Short Messaging Services ("SMS"). SMS messages allow users of the network and the gateways to send and receive packets of data (about 160 characters) without setting up an actual call connection. Receiving terminals, whether mobile stations, such as handsets or pagers, or fixed terminals, like computer workstations, reassemble one or multiple related SMS message packets into readable messages, such as an e-mail or page.

In another embodiment, the present invention provides a method for uploading a large data file via the wireless network. For such larger files, an actual circuit-switched call is made from the gateway to a central processor coupled to the wireless network's switch or MSC. The central processor includes a controller with a communications processor and database server. The communications processor sets up a session with the gateway during which the gateway can upload the file via the wireless network. In a wireless network, large files of digital data from the gateway may be moved from the MSC to a destination via the Inter-Working Function ("IWF"). The central processor can be co-resident with the MSC or coupled to it via another network connection, such as the PSTN or a wireless connection.

An example use for this embodiment involves a program by which the gateway periodically polls the devices it connects to for energy usage rates. Each poll generates a message that is about 100 bytes long. Rather than forwarding each message via the wireless network to the customer or a database, the gateway aggregates all reads for a particular time period and then uploads the entire file to the central processor via the IWF.

A customer may access the central database in order to determine energy or device utilization at the customer's facility. The database can be coupled to a control system that regularly downloads data and commands to the gateways. In that event, the customer can also pass instructions to the control system to forward desired commands or new data to the gateway in order to control the devices coupled to it.

An alternative embodiment of the invention takes advantage of the architecture and protocols of the GPRS or General Packet Radio System to deliver data from and commands to gateways. The GPRS protocol provides an architecture and various interface layers (both hardware and software) for implementing a packet data system across existing wireless networks, regardless of the type of wireless protocol (e.g., TDMA, CDMA, GSM) used by those networks. Certain GPRS protocols for implementing this architecture are described in the following documents, each of which is incorporated in its entirety by this reference: (1) GPRS MS-SGSN LLC, GSM 04.64 (ETSI No. TS 101 351); (2) GPRS MS-SGSN SNDCP, GSM 04.65 (ETSI No. TS 101 297); (3) IW PLMN GPRS-PDN GSM 09.60 (ETSI No. EN 301 347); (4) GPRS PDN, GSM 09.61 (ETSI No. TS 101 348); and (5) Digital Cellular Telecommunications System (Phase 2+): GPRS Project scheduling and open issues, GSM 10.60.

The present invention implements a GPRS over a wireless network, such as a GSM network. Such a network uses base station controllers to route voice communications to the existing wireless system infrastructure, such as MSCs, HLRs and the like. In a GPRS capable network, however, the handshakes generated by wireless devices inform the base stations that a particular transaction is a packet data transaction; in turn, the base stations so inform their base station controller, which can then route the packet data to a support node rather than an MSC and its supporting infrastructure. The support node may communicate with other public wireless or wired networks or with an IP (internet protocol) network. By, for instance, repackaging the wireless data message into an internet packet, the support node interfaces more easily between the base stations and the IP network than existing wireless systems. This protocol may result in not only higher data transmission rates (i.e, larger data payloads than the limited SMS packets), but also in faster data delivery since data transfer does not require signalling to set up connections among network elements.

Whether using GSM short messaging services or GPRS messages to deliver data to and from multiple gateways located throughout a particular region, the present invention performs the following processes:

Formatting messages for wireless delivery to and from particular or groups of gateways. In an SMS implementation, this may be accomplished at the gateway, which formulates messages to other terminals into a short message format, or, if the message is destined to a particular gateway, at the originating terminal. In a GPRS implementation, the support node places messages in varying formats depending on which network over which they will be transmitted and appropriate to that network. Additionally, as packet data messages are transferred among network elements in the GPRS, information is added or substracted from the message header depending on the particular stage of intra-network transfer.

Transmitting the message from the gateway to a network element or vice versa. The Short Messaging Service Control center handles this functionality, since it is programmed to identify and route SMS messages to their appropriate destination. In the GPRS implementation, transmission is accomplished by first having the base station controllers forward packet data messages to a support node router, which routes the messages to their desired destination.

Delivering messages to the user directly or to a central processor for storing and processing. In either implementation, messages may be delivered via an IP network or other public or private communications network.

Routing commands or data to one or groups of gateways. The commands or data can be formulated at and sent out by the central processor over either the GPRS or SMS implementation. However, because each gateway is uniquely addressable through, for instance, a phone number, IP address, or similar identifier, the customer can formulate messages or commands that will be routed directly from the customer's mobile station or fixed terminal to the gateway.

The present invention accordingly aims to achieve at least one, multiple or all of the following objectives:

To provide a system and method for monitoring in real time and for controlling remotely located gateways;

To provide a method for allowing customers to remotely monitor and control devices located in the customer's facility that communicate with a gateway;

To provide a method for allowing customers to receive monitoring information about activities at their facility via a mobile station or a fixed terminal;

To additionally provide a method that allows customers to control the gateway and devices coupled to the gateway from their mobile station or a fixed terminal communicating over the wireless network;

To provide a method for customers to forward commands and data to a central processor for delivery to the gateway;

To take advantage of the short messaging service capability of a deployed GSM network to more efficiently provide remote monitoring and control of multiple distributed gateways;

To provide a central processor for receiving monitoring messages from remotely located gateways and aggregating those messages to track activities at the facility associated with a particular gateway; and To provide methods for customers to access data stored at the central processor.

Other objects, features and advantages of the present invention will become apparent upon reading the rest of this document.

DETAILED DESCRIPTION OF THE DRAWINGS

System Overview: SMS Application

Figure 1:
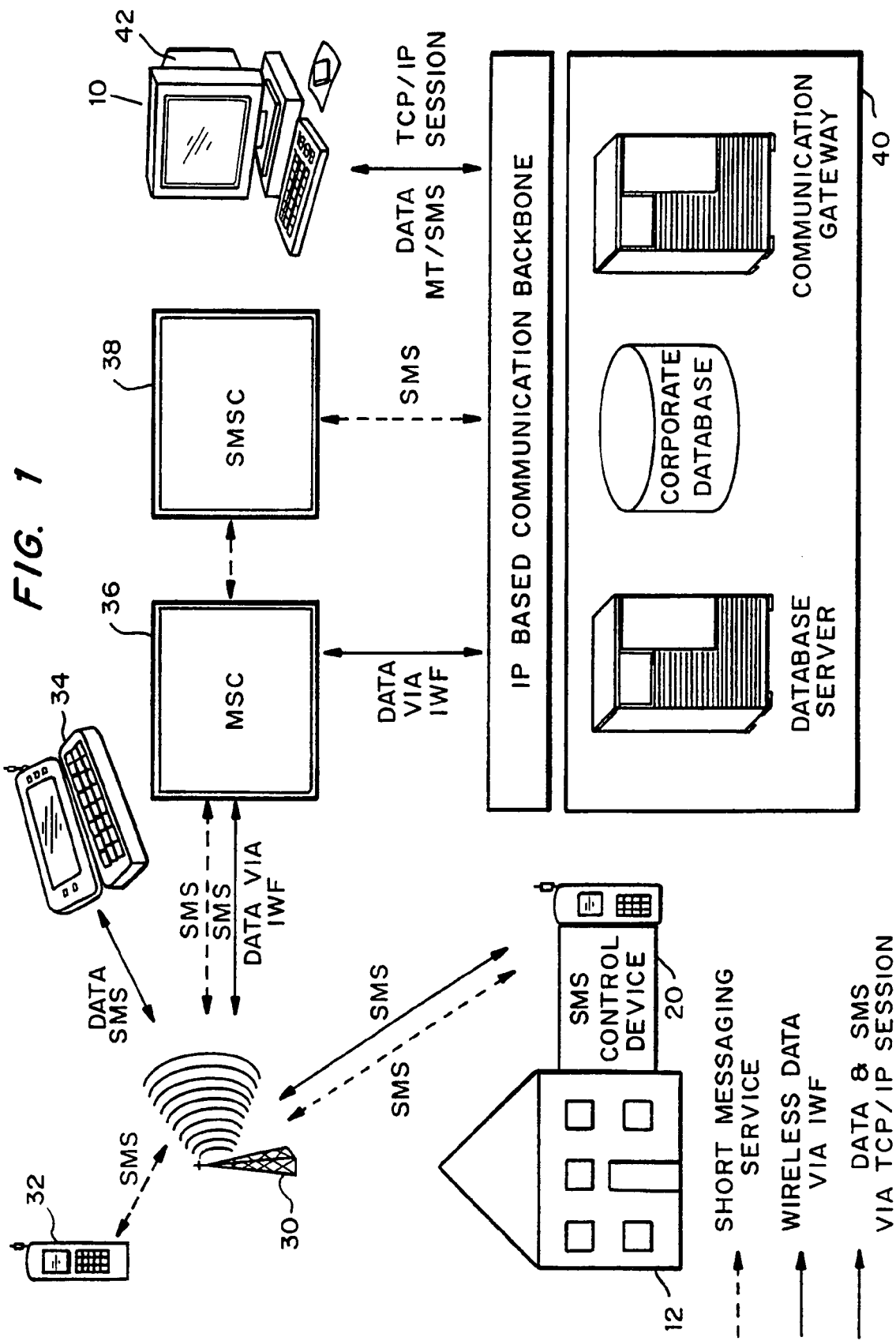
FIG. 1 shows a block diagram of a system according to the present invention that implements various methods for receiving and sending data from and to a selected gateway.

FIG. 1 shows a system 10 for implementing the methods of the present invention. System 10 monitors and controls various devices deployed in multiple facilities 12, which could be a home, office building or industrial complex. Each facility 12, or portion thereof, has a gateway 20 that acts as a data collection and control device, as defined below. Data received from various devices within and associated with facility 12 is packaged by gateway 20 for forwarding via a wireless digital communications network, which may be either a cellular network or a Personal Communication System ("PCS") network. The system 10 of the present invention aims to route messages from various gateways 20 to terminals. A terminal may be a fixed terminal, such as central processor 40, an ISDN terminal or a workstation 35 (shown in FIG. 3), as well as a mobile station. The phrase "mobile station" means a device for sending and receiving data over a wireless network and includes, for instance, a pager 31, a handset 32 or an internet communicator 34 that may be a Nokia 9000 GSM communicator capable of accessing the internet via a GSM wireless network.

Figure 3:
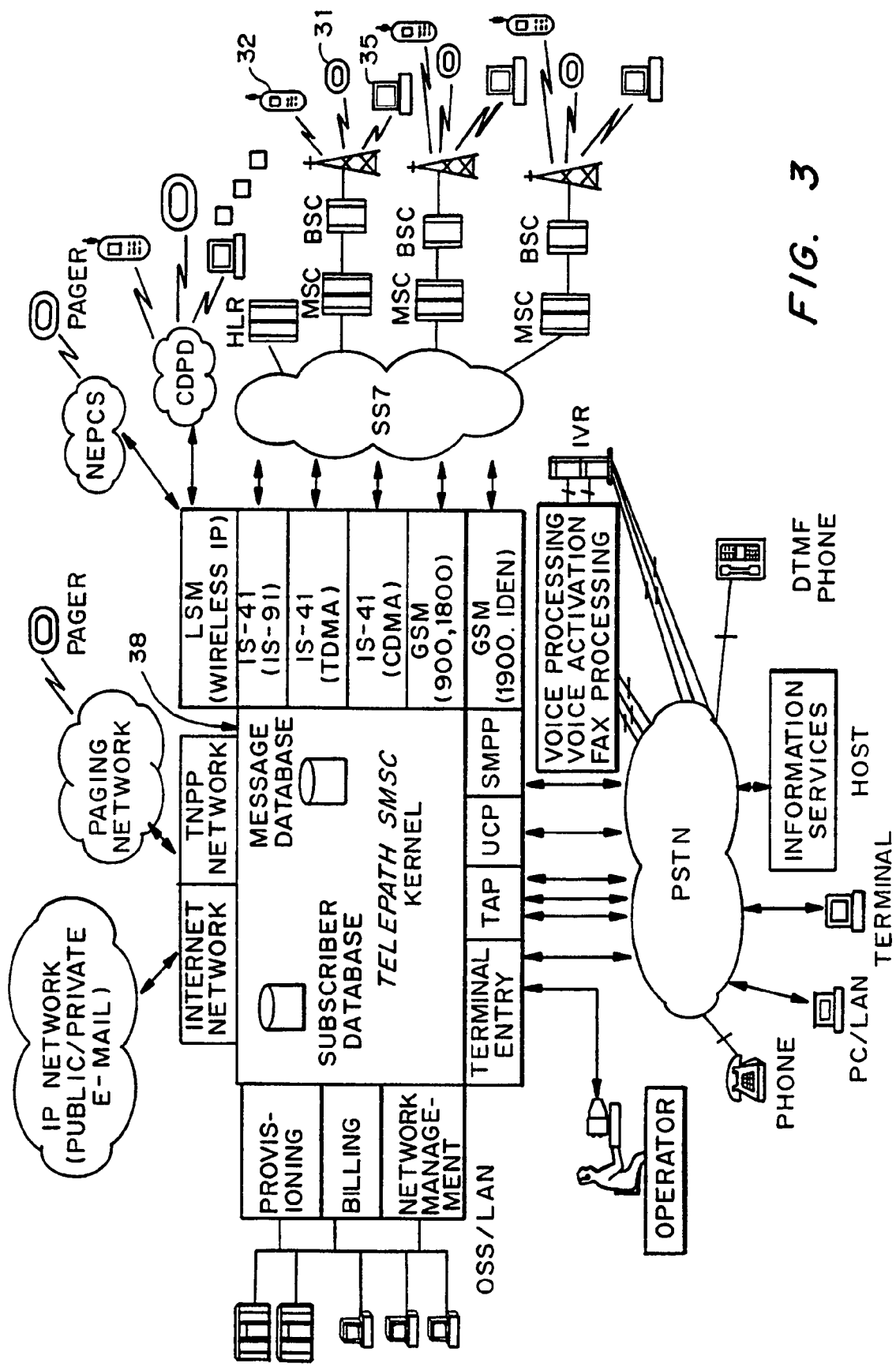
FIG. 3 shows a block diagram of one embodiment of the system shown in FIG. 1 detailing the method and system components used to route SMS messages.

Such a network may have a number of cellular sites, each served by a tower 30 holding a base station and appropriate equipment for receiving and transmitting wireless voice and data messages. Those messages are routed to the appropriate terminal, such as a pager 31, cellular handset 32, cellular internet communicator 34, or workstation 35, by the mobile switching center ("MSC") 36 that may be a switch provided by Nortel, Lucent, Erricson or other switch makers. If the messages are Short Messaging Service ("SMS") messages, MSC 36 receives each SMS message, determines it is an SMS and switches the SMS message to a SMSC ("Short Message Service Center") 38, which may be a platform, such as one provided by Logica-Aldiscon, Inc., of Lexington Mass., either co-located with the MSC 36 or coupled to it via a communication link. SMSC 38 listens on a socket for SMS messages in order to route received SMS messages to the appropriate destination. Additionally, SMSC 38 receives outgoing SMS messages and reformats those messages for transmission through the MSC 36. Typically, for instance, SMSC 38 may link to MSC 36 via a SS7 data communication link (as shown in FIG. 3); SMSC 38 can then route SMS messages to subscribers roaming in other wireless networks via Signal Transfer Points within the SS7 network.

The term "gateway" includes any device that (a) provides a physical interface between internal devices associated with a particular facility 12 and external networks and, optionally, (b) may provide a platform for delivering various services to the facility 12. Thus, gateways 20 may couple to a remote facility 12 and may monitor, control or both monitor and control various devices within the facility 12, such as lights, security sensors, an answering machine, a home computer, etc. For instance, gateway 20 may be a set-top box, personal computer or other device provided with a processor, such as an Intel 386 or 486 processor, and communicates with various, optionally addressable, devices located throughout the facility. Gateway 20, which may be uniquely addressable, also has a wireless transceiver for sending and receiving communications via a digital wireless network.

Additionally, for the embodiment of the present invention that uses a GSM network, gateway 20 is an integrated GSM enabled communications device programmed to format and manage data packets sent and received via the short messaging service provided by a GSM network, as described further below. Gateway 20 sends and receives SMS messages via and as part of the architecture of a GSM network. For instance, gateway 20 may be a GSM device that allows transfer of data, facsimile or e-mail messages, but which does not have voice capability. These messages can be formulated and read by a SIM or "Subscriber Identity Module" card that can be plugged in or otherwise incorporated into gateway 20. Gateway 20 is programmed to generate text for an outgoing SMS message, place it in the SIM card of the gateway 20 and initiate the data transfer over the GSM network. Thus, gateway 20 may use bi-directional host computer to SMSC programming code to control the SIM card interface and the automatic SMS message routing application. The GSM network also delivers messages to the correct location and gateway 20 confirms the accuracy of any received message to the sender. When an SMS message is received at the gateway 20, the gateway 20 reads the SMS message from the SIM card and processes the contents of the SMS message as though it was entered directly from a command console.

FIG. 3 shows the methods and components of system 10 used for formulating and reading SMS messages sent and received by and from SMSC 38 to and from a selected gateway 20. SMSC 38 may be provided with a SMS Application that facilitates sending and monitoring of short messages between an end user and the SMSC 38. The messages can be generated by using a GUI based front end application or by delivering a message in a pre-defined format to the relational database tables used to store outgoing messages. The SMS Application queues outgoing messages and sends them one at a time to the SMSC 38 for distribution on the GSM network. In turn, the SMSC 38 returns a message indicating the delivery status of the outgoing message. SMSC 38 may communicate over an internet network with e-mail users or over a TNPP network with pagers; likewise, through those networks or the PSTN, users may communicate with the SMSC 38 to formulate and send messages for subscribers. Finally, FIG. 3 shows the OSS/LAN support structure for supporting operations of an SMSC 38.

The SMS Application can be configured to receive an SMS message from the SMSC 38. In this configuration, the SMSC 38 will receive a message from the GSM network and forward it via a direct connection to the SMS Application rather than initiating a message transfer to another mobile station or terminal via the GSM network. Through the incorporation of a fully bi-directional message transfer system, a wireless end user may (a) receive messages and initiate responses via the GSM network to control devices attached to gateway 20 or (b) update the application database directly. Thus, as FIG. 2 indicates, DCS Messaging software, developed by BellSouth Mobility, and deployed on the central processor 40 may be programmed to perform at least the following tasks:

Front End Client Application—This task enables end users to input a text message, up to 190 bytes, and send the message directly to the SMSC 38 for distribution across the GSM network. A graphical user interface or GUI allows for flexible, intuitive input and output. After entry of messages, this application updates the Database (such as databases provided by the Oracle Corporation) Tables with the message data.

Database Tables—This task stores outgoing text messages, message status for inquiry and resolution and routing information for the message. The database tables can be populated by the front end client application or directly from another server process.

Message Server—This task mediates between various Database Tables and the socket used for communicating with the SMSC 38. It will query Database Tables for new outgoing messages and query the SMSC 38 to check the status of existing messages, which are routed to central processor 40 for storage in the Database Tables.

Socket Layer—This task performs the bi-directional communication between the Message Server and the SMSC.

An API on workstation 42 accesses the DCS Messaging software, which acts as a server to provide the GUI that allows input of new messages into the central processor 40.

Alternatively, by reconfiguring MSC 36 to route SMS messages and reconfiguring gateway 20 to listen for such messages, the system 10 could be configured so that SMS messages go directly to the gateway 20 without passing through a SMSC 38. Such distributed message delivery eliminates possible routing errors at SMSC 38. A central processor 40 may also receive or be copied on the messages from gateway 20 to handset 32 or communicator 34. On the other hand, this distributed architecture would be substantially more expensive and complex, requiring dedicated SS7 links between MSC 36 and each of gateways 20, which also would have to be provided with software to enable SMS routing throughout the network.

Methods for Delivering SMS Messages

In one embodiment of this invention, the wireless network is a GSM network represented by tower 30, pager 31, handset 32, communicator 34, and MSC 36, which may be a Nortel switch running GSM. This network provides integrated voice and enhanced digital services, including e-mail or SMS to the user's mobile station, which may also have integrated voice mail, caller ID functions, a fax mailbox, etc. The GSM standard defines a short messaging service, which allows users of the network to send and receive short data messages, usually in the form of alphanumeric text. Such messages can be sent and received even during an on-going communication session. SMS messages may be configured for delivery to a particular identified terminal, such as handset 32, or they may be broadcast throughout a specific geographical area by using the SMS cell broadcast feature. This broadcasting function, described in the GSM 03.41 and GSM 04.11 that are incorporated herein by this reference, is useful for reprogramming multiple gateways 20 simultaneously or warning customers at various facilities 12 of particular events in their geographic area (e.g., a weather warning or the like).

A system 10 using a GSM network allows SMS messages with a payload of about 160 bytes or characters to be sent at 9600 Baud from a gateway 20 to a terminal via a GSM network and supporting sub-components. A GSM network supports multiple points of origin or destination of the SMS messages, allowing for two-way communication among terminals and gateways 20, each of which are provided with a unique identifier, such as a phone number or an IP address. Significantly, this architecture allows data communications among gateways 20 and mobile stations, like pager 31, handsets 32 and communicator 34, or fixed terminals, through virtual direct connections among all of those devices using the GSM network and supporting sub-components for transport. This provides a virtual point-to-point connection via the GSM network, and the SMS messages may or may not be sent to or through the central processor 40. By taking advantage of the SMS services provided in a GSM network, the network functionality required for forwarding short data messages to and from gateways 20 need not be developed from scratch.

By way of example, assume that gateway 20 monitors facility 12 for energy usage data or alarms indicating a security breach as well as communicates with various electronic devices, such as an electronic thermostat or lights. The digital GSM network allows gateway 20 to periodically upload a SMS message, providing essentially real time monitoring of energy usage at the particular facility 12. For instance, the GSM network may allow message uploading as frequently as every 5 minutes. Gateway 20 could be programmed to provide periodic (e.g., hourly) reports on energy usage. If a security sensor coupled to gateway 20 triggers, gateway 20 could be configured to package and transmit, usually on a priority basis, a SMS message indicating a breach in security, as well as other data including the date and time, the location of the facilities, or the location of the sensor.

In another embodiment of this invention, a microcell may be provided for very large facilities 12, such as industrial complexes, manufacturing facilities, distribution facilities or the like. A microcell allows persons within a large facility 12 to communicate with one another and the gateway 20 for that facility 12 via handsets 32. Such communications may be routed via MSC 36. For instance, such a microcell would provide the facility 12 with a wireless PBX, wireless data connectivity to corporate databases or wireless internet access.

Methods for Delivering Data via the IWF

An alternative embodiment of the invention allows gateway 20 efficiently to upload a large file of information to the central processor 40. By way of example, gateway 20 could have been instructed to poll devices coupled to it throughout the day to determine their energy usage. Then, instead of immediately reporting the results of each poll, gateway 20 buffers the information within memory for uploading to central processor 40 on command or at a preselected time. If the file is fairly large, rather than forwarding the file by sending one or multiple SMS messages that would need to be reassembled, gateway 20 has the capability to upload the file via an Inter Working Function (IWF) protocol. To do so, gateway 20 sets up a call to central processor 40, during which call gateway 20 packages and forwards the file via the IWF protocol. Although uploading data via the IWF transfer process uses a more expensive voice channel rather than a data channel, it allows faster upload of large files.

Delivery of Data via GPRS

Figure 4:
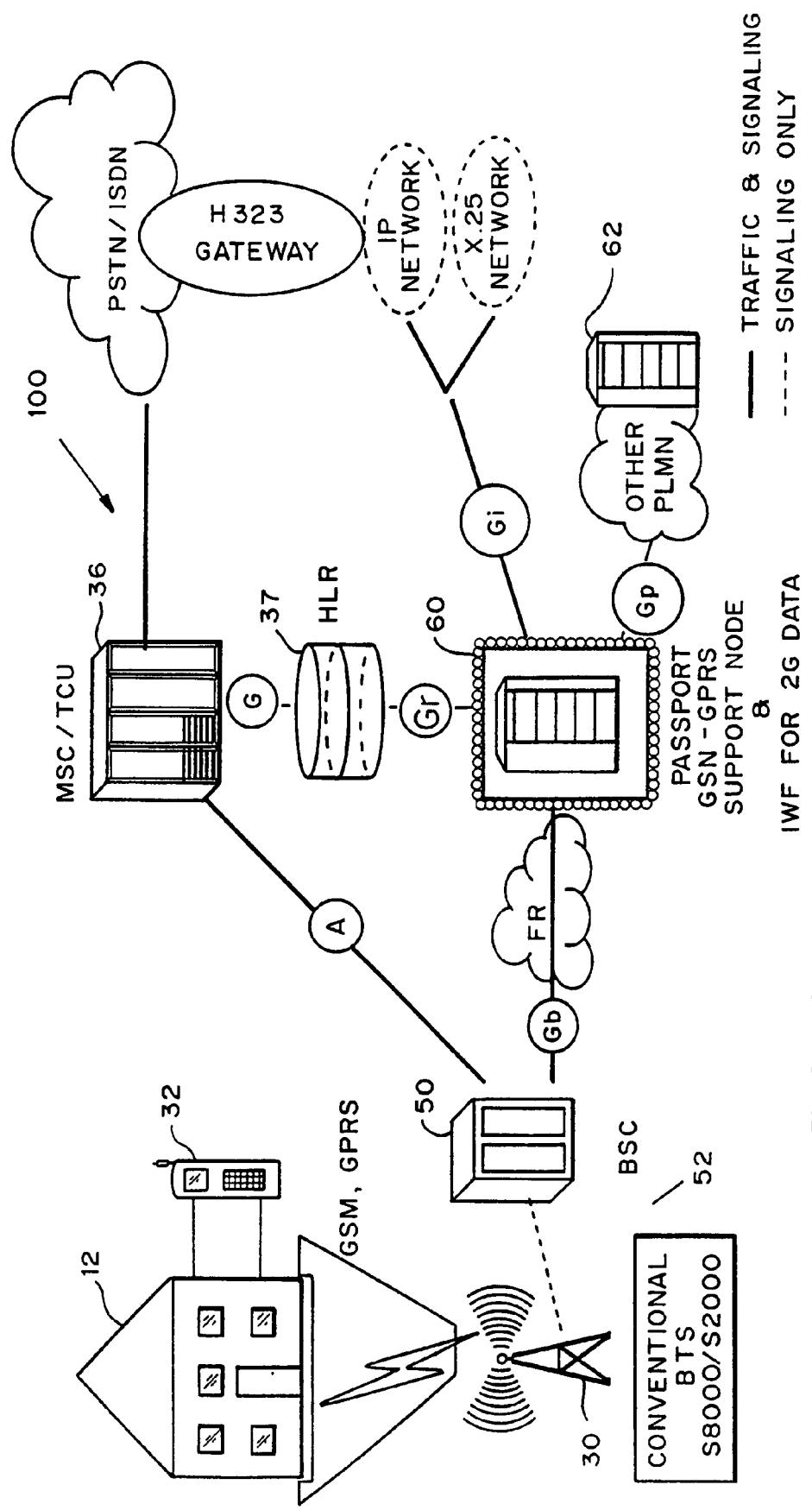
FIG. 4 shows a block diagram of an alternative embodiment of a wireless GSM system using the GPRS format and architecture to route data and commands to and from a gateway.

FIG. 4 shows a wireless network 100 provided with GPRS functionality. Network 100 is a GSM network, but could utilize other protocols, including TDMA, CDMA or the like so long as those networks operate the General Packet Radio System ("GPRS") protocols. Network 100 has multiple towers 30 coupled to multiple base stations ("BTS") 52, each controlled by a base station controller ("BSC") 50. BSC 50 has been modified to route calls to MSC 36, communicating with a conventional HLR database 37. Note that the gateway 20 in FIG. 4 has the same functionality as the gateway 20 in FIGS. 1 through 3, but may be implemented differently. For instance, since a GPRS may be deployed in other than GSM networks, a SIM card need not be provided to gateway 20, which instead may simply be outfitted with a cellular transceiver appropriate to the type of cellular network 100 in which the gateway 20 will be transmitting messages.

BSC 50 identifies and routes data messages to a support node 60. BSC 50 identifies data messages in a GPRS system because handshake messages from the gateway 20 inform the base station 52 that the particular transaction is a packet data transaction. Other methods exist for identifying such transactions, including examining identifiers placed in the data message by the user toggling certain functions on the delivery device or by analyzing the message itself. In any event, data messages from gateway 20 are assembled by a PAD into packets per the GPRS protocol specification for delivery to the support node 60. FIG. 4 shows Gb and other interfaces that specify header information and such for allowing various network elements to communicate with one another. Support node 60 is a SGSN/GGSN (Server GSM Support Node or Gateway GSM Support Node), such as a Passport carrier grade data platform system available from Nortel Networks or any other platform suitable for use as a router. FIG. 4 shows that support node 60 packages data messages that arrive from facility 20's gateway 20 for delivery over one of many types of networks to a central processor 40 (shown in FIGS. 1 and 2). The delivery network may be an IP network, an X.25 network, or other public land/mobile networks 62. Network 100 may also deliver messages, queries or commands from a central processor 40 (or another terminal) to the facility 12 that couples via an over-the-air interface to the base station 30 shown in FIG. 4.

To send a message to a particular gateway 20, a user accesses the network 100 through a mobile station or fixed terminal. The user enters the gateway 20's identifier and formulates a message. The message, whether sent over a public telephone, via a workstation 42 as e-mail, or through a mobile cellular handset 32, is sent by the network 100 to the support node 60. Support node 60 reads the identifier and associates the identifier with the BSC 50 that is associated with the destination gateway 20 and routes the message to that BSC 50, which then broadcasts the message via BTS 30.

Note that as in the SMS implementation, a common message to multiple gateways 20 may be sent over network 100. This is feature may be used to alert gateways 20 to a particular condition (e.g., weather, etc.) common to the geographical area in which the gateways are deployed or to send instructions to multiple gateways 20 controlled by a single user. Messages may be broadcast, for instance, to all gateways 20 with a common NPN in their identifying phone number. Messages with that NPN may cause the support node 60 may to do a table look-up and determine the particular gateways associated with the NPN; thereafter, the support node 60 will route the same message to each such gateway 20 by instructing each BSC 50 to forward the message to each applicable destination. Of course, skilled persons will recognize other means than a common NPN for specifying a group of gateways 20 to which a common message may be broadcast.

By using GPRS to transport data messages to and from gateway 20, the network 100 is able to transport messages larger than the 160 bytes allowed in an SMS message. Also, GPRS enhances wireless services by emphasizing internet protocol (IP) technology to allow seamless operation with the internet, packet-oriented data services, and inter-working with legacy wireless systems. For instance, GPRS provides variable data rates for transmitting messages via the over-the-air interface between wireless device and base station that range from 11.2 to 22.8 kbps for a single slot allocation. Multi-slot configurations provide 22.4 to 182.4 kbps data throughput. Future enhancements to GPRS data rates are expected to provide 69+ kbps bit rate over the air interface, using a different modulation scheme. Data rates in packet mode are expected in the 45-550 kbps range.

Collating and Accessing Data at the Central Processor

Figure 2:
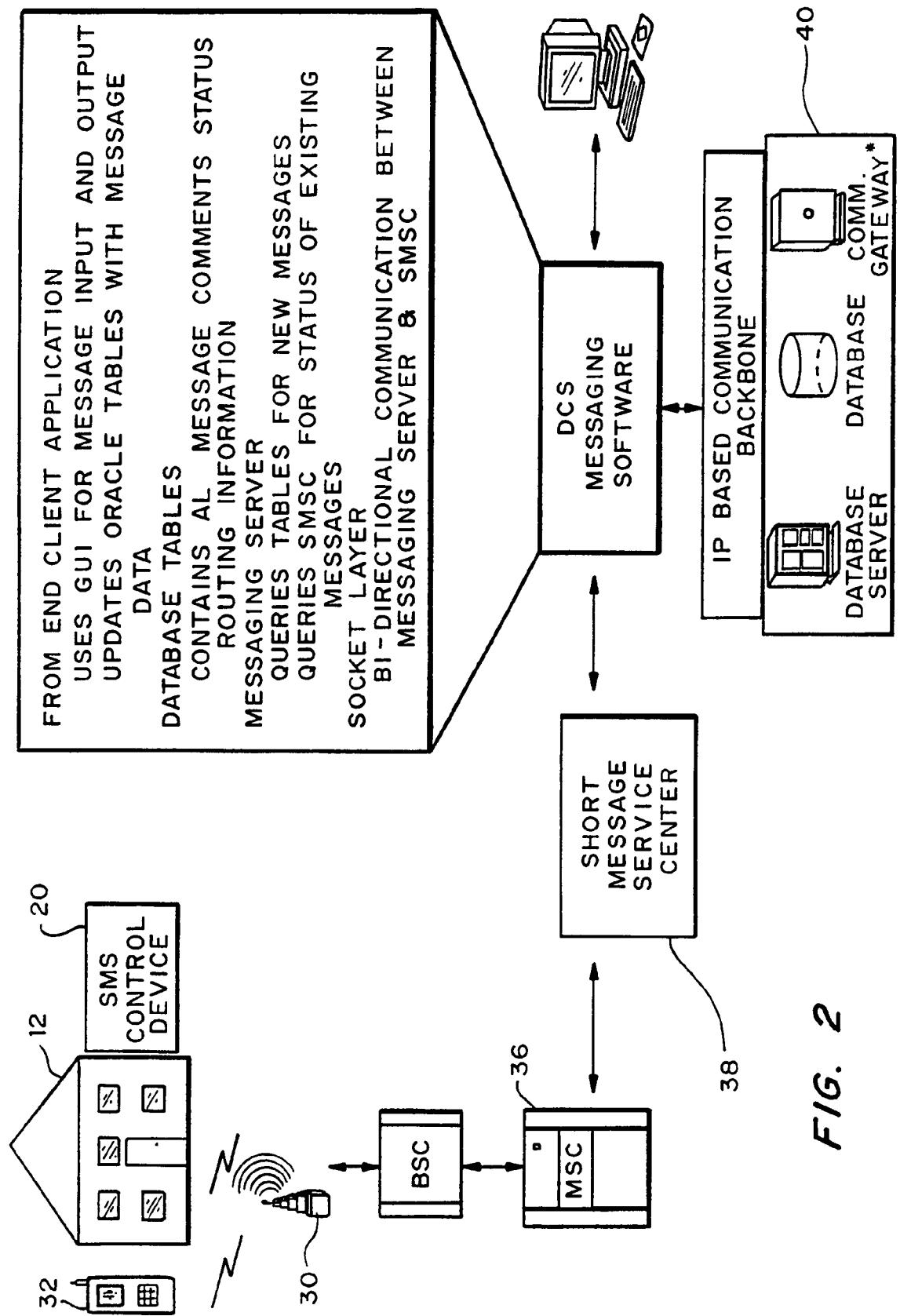
FIG. 2 shows a simplified block diagram of the system shown in FIG. 1, with labels indicating the functionality of various system components.

As described and shown in FIGS. 1 and 2, central processor 40 receives data from multiple gateways 20. Central processor 40 has a database for storing information uploaded via SMS messages or the IWF protocol. The stored information may be collated and organized according to customers, facility, etc. Customers may access the database via the communication gateway. For instance, customers may use a workstation 42 to set up a TCP/IP session via an Internet Protocol ("IP") communication network, such as provided by a local Internet Service Provider ("ISP"). Through the internet connection, customers can easily view data describing the energy usage of devices at facility 12, as well as check on the status of various other activities logged into the database at the central processor 40. Note that customers can set up a TCP/IP session either through a terminal connected to an ISP, such as workstation 35, or via the communicator 34 that connects to the internet via a wireless network.

Additionally, while viewing data describing activities at facility 12, the customer may also input commands to be forwarded to various devices at the facility 12. Central processor 40 packages those commands as an SMS message and downloads them to a particular gateway 20 through the SMSC 38. Although FIGS. 1 and 2 show central processor 40 coupled to MSC 36 and SMSC 38 via a PSTN connection, central processor 40 could be co-located with those platforms or communicate with them via a different communications link. Alternatively, central processor 40 may be provided as part of, or couple to, a support node 60 so that messages or commands entered by customers may be formatted as a GPRS packet for transmission over the network 100 that operates a GPRS, as shown in FIG. 4.

An example use of the methods and systems of the present invention is described as follows. Gateway 20 is programmed to poll each device coupled to it to determine the device's energy use. For instance, gateway 20 can be connected to the thermostat, refrigerator, water heater, and washer/dryer in a particular residential facility as well as to the general meter for that facility. Gateway 20 polls those devices every hour to determine their energy use. Gateway 20 then forwards the poll results to the SIM card, which generates a SMS message containing the poll results as well as the date, time and location of gateway 20. The SMS message is then transferred from gateway 20 to central processor 40 via the MSC 36 and SMSC 38. Central processor 40 collates each hourly message from gateway 20 to form a visual graph depicting overall and individual device energy usage at facility 12. This allows a customer to access the database coupled to the central processor 40 via the internet and determine the overall energy usage at a particular facility 12. The customer can then, based on the energy usage trends, input commands to adjust the thermostat, or turn off one of the devices (such as the washer/dryer or water heater) coupled to the gateway 20 in order to save energy. Likewise, the user can input other commands for delivery to the gateway 20. For instance, the user could instruct the gateway 20 to enable or disenable an alarm system at a particular facility 12 at a particular time and for a particular time period. The present invention also allows the gateway 20 to be programmed to copy messages on energy uses or alarm triggers at a particular facility 12 directly to a handset 32 associated with the owner of facility 12. Likewise, gateway 20 can have its normal routine interrupted by a priority data message. For instance, if gateway 20 couples to alarm sensors at the facility 12 and one sensor alerts to an intruder, gateway 20 can be programmed to send a message both to the handset 32 in order to alert the owner of the facility 12 and to the central processor 40, which processes the message in order to alert the authorities to the security breech. These are, of course, just two of many applications for which gateway 20 and the present invention can be used.

The foregoing is provided for purposes of explanation and disclosure of preferred embodiments of the present invention. For instance, a preferred embodiment of this invention involves using a GSM network with a short messaging service capability or a GPRS capable wireless system. It is expected that such capabilities or their equivalent will be provided in other standard types of wireless networks, in which case the preferred embodiment of this invention may be easily adapted for use in such networks. Further modifications and adaptations to the described embodiments will be apparent to those skilled in the art—such as upgrades or modifications to the GSM or GPRS protocols—and may be made without departing from the scope or spirit of the invention and the following claims.

What is claimed is:

1. A method for remotely monitoring or controlling activities within multiple facilities geographically dispersed within at least one wireless network adapted to transmit GSM short messages to allow the facilities to communicate with other terminals without making a wireless telephone call, the method comprising:
   providing the selected facility with a gateway comprising a processor, a transceiver and a SIM card adapted to transmit short messaging service messages;
   periodically causing the gateway to formulate a short message reporting on activities within the selected facility at which the gateway is located;
   transmitting the message over the GSM network via a Short Messaging Center coupled to a Mobile Switching Center within the GSM network;
   receiving the message at a terminal selected from a group of devices consisting of a mobile station, a work station and a central processor; and
   controlling devices located at a selected facility by formulating a control message and forwarding it via the GSM network to the selected facility, wherein the gateway at the facility processes the control message in order to control one or more devices coupled to the gateway, and wherein a direct connection is provided for transmitting the short message between the gateway and the terminal without making a telephone call.

2. A method according to claim 1 further comprising the step of collecting multiple messages from the selected facility, storing those messages in a database associated with a central processor and processing the stored messages at the central processor to display information concerning activities at the selected facility.

3. A method according to claim 1 further comprising the step of monitoring energy uses within the selected facility by periodically polling at least one device therein.

4. A method according to claim 3 further comprising the step of aggregating the periodic polls and uploading the aggregated information to a user's terminal.

5. A method according to claim 1 in which the control message is formulated by a user on a communication device selected from the group consisting of a pager, a cellular handset, an internet wireless communicator or a workstation.

6. A method according to claim 5 further comprising the step of coupling the central processor to an internet protocol network to allow users to view the displayed information concerning activities at the selected facility.

7. A method according to claim 6 further comprising the step of monitoring energy uses within the selected facility by periodically polling at least one device therein.

8. A system for transmitting data to and from multiple gateways deployed in homes or businesses and capable of collecting data concerning usage or operation of various devices located in the homes or businesses, the system comprising:
   multiple gateways, each adapted to formulate or accept a wireless packet data transmission, wherein each gateway is configured to process the wireless packet data transmission to control one or more devices coupled to the gateway;
   a base station controller adapted to route data forwarded to the base station controller via wireless transmission to a support node, the support node formatting the message into a format selected from the group consisting of internet protocol, X.25 protocol and a data protocol depending on which network over which the message will be transmitted; and
   a terminal for receiving the formatted messages.

9. A system according to claim 8 further comprising a mobile station or a fixed terminal from which a user may formulate and send a message directly to one or groups of the multiple gateways.

10. A system according to claim 8 wherein the terminal is a central processor that collates the formatted messages to describe the conditions within the facility associated with a selected one of the multiple gateways.

11. A system according to claim 10 further comprising a workstation for accessing the formatted messages collated by the central processor.

12. A system according to claims 11 wherein the workstation allows entry of commands to be delivered via the support node to one or groups of the multiple gateways.

13. A method for using a wireless network to deliver messages from or to each of multiple gateways that are deployed in geographically-dispersed facilities comprising:
   formulating a message from a gateway for wireless transmission according to a GPRS format;
   transmitting the message to a network element for identifying that message; and
   transferring the message from the network element to a central processor for collating the transferred messages with other messages or data related to a selected gateway,
   wherein a user accesses the collected message via the central processor, and controls the gateway by formulating a command that will be routed directly from the user's mobile station to the gateway.

14. A method according to claim 13 in which the transmitting step comprises the step of coupling the network element to an Internet Protocol network for forwarding the message to the central processor.

15. A method according to claim 13 in which the formulating step occurs when a user formulates the message from a mobile station.

16. A method according to claim 13 in which the network element is a base station controller that determines that the message is a GPRS data transmission and routes the message to a second network element comprising a support node.

17. A method according to claim 16 in which the transmitting step comprises the step of coupling the network element to an Internet Protocol network for forwarding the message to the central processor.

* * * * *